United States Patent
Seifert et al.

(10) Patent No.: US 9,768,844 B2
(45) Date of Patent: Sep. 19, 2017

(54) DOUBLE ITERATIVE MIMO RECEIVER

(71) Applicant: Vodafone GmbH, Dusseldorf (DE)

(72) Inventors: Tobias Seifert, Dresden (DE); Gerhard Fettweis, Dresden (DE)

(73) Assignee: VODAFONE GMBH, Dusseldorf (DE)

( * ) Notice: Subject to any disclaimer, the term of this patent is extended or adjusted under 35 U.S.C. 154(b) by 0 days.

(21) Appl. No.: 15/003,443

(22) Filed: Jan. 21, 2016

(65) Prior Publication Data
US 2016/0218781 A1    Jul. 28, 2016

(30) Foreign Application Priority Data

Jan. 22, 2015   (EP) .................................... 15152090

(51) Int. Cl.
| | | |
|---|---|---|
| H04B 7/04 | (2017.01) | |
| H04B 7/0456 | (2017.01) | |
| H04B 7/0417 | (2017.01) | |
| H04L 25/03 | (2006.01) | |

(52) U.S. Cl.
CPC ......... *H04B 7/0456* (2013.01); *H04B 7/0417* (2013.01); *H04L 25/03159* (2013.01); *H04L 25/03248* (2013.01); *H04L 25/03993* (2013.01); *H04L 2025/03414* (2013.01)

(58) Field of Classification Search
CPC ............................................ H04L 2025/03414
See application file for complete search history.

(56) References Cited

U.S. PATENT DOCUMENTS

| | | | | |
|---|---|---|---|---|
| 7,292,661 B1 * | 11/2007 | Chan | ................... | H04L 25/0212 375/229 |
| 8,767,849 B2 * | 7/2014 | Yin | ..................... | H04B 1/71072 375/229 |
| 2004/0132416 A1 * | 7/2004 | Yee | ........................ | H04L 1/0618 455/82 |
| 2011/0268019 A1 | 11/2011 | Tang et al. | | |
| 2012/0263222 A1 | 10/2012 | Wang | | |
| 2014/0348120 A1 * | 11/2014 | Kant | ..................... | H04L 1/1835 370/329 |

FOREIGN PATENT DOCUMENTS

EP         1 411 693 A2    4/2004

OTHER PUBLICATIONS

European Search Report for EP 15 15 2090 dated Jun. 26, 2015.

* cited by examiner

*Primary Examiner* — Ross Varndell
(74) *Attorney, Agent, or Firm* — Workman Nydegger

(57) ABSTRACT

A multiple-input multiple-output (MIMO) receiver comprises a MIMO frequency-domain equalizer, which comprises a MMSE filter for mitigating inter-symbol interference and an adder for mitigating inter-antenna interference, a MIMO detector and a MIMO decoder for processing a received MIMO signal and for estimating transmit bits. The receiver comprises a feedback path from the decoder to the detector for providing soft-information on the transmit bits to the detector and an additional feedback path from the decoder to the MIMO frequency-domain equalizer for providing soft-information to the MMSE filter and to the adder of the equalizer.

12 Claims, 2 Drawing Sheets

DOUBLE ITERATIVE MIMO RECEIVER

CROSS-REFERENCE TO RELATED APPLICATIONS

This application claims the benefit of and priority from European Patent Application No. 15152090.5, filed Jan. 22, 2015, the entire disclosure of which is expressly incorporated by reference herein in its entirety.

BACKGROUND

The invention relates to an iterative Multiple-Input and Multiple-Output (MIMO) receiver and a corresponding method for receiving and blockwise processing of symbols in a MIMO transmission system. In particular the invention relates to a wideband MIMO receiver comprising at least two receive antennas, wherein the receiver comprises an adaptive equalizer, a MIMO symbol detector, a decoder, a first feedback path for feeding back soft information from the decoder to the MIMO symbol detector and a second feedback path from the decoder to the adaptive equalizer for feeding back soft information about estimated transmit symbols to mitigate intersymbol interference (ISI) and inter-antenna interference (IAI).

Future mobile communication standards like LTE-Advanced make use of MIMO techniques in order to fulfill the increasing demand on high spectral efficiency. Hereby, spatially-multiplexed data streams are transmitted and received by multiple antennas, i.e. transmit symbols are radiated simultaneously on the same radio resources via at least two transmit antennas and a receiver receives the radiated transmit symbols via a plurality of at least two receive antennas. In order to estimate the originally transmitted data, i.e. before symbol detection takes place, the receiver has to cancel out interferences as far as possible. Besides noise, e.g. Gaussian distributed white noise, the received signals are distorted by inter-antenna interferences, abbreviated IAI, and inter-symbol interferences, abbreviated ISI. Consequently, i.e. in order to improve estimation of the originally transmitted data, both the IAI and the ISI should be cancelled out for each receiving antenna.

Besides high throughput, energy efficiency of mobile devices is of the utmost importance due to limited battery life time. Therefore, modulation and multiple-access schemes like single-carrier (SC) frequency-domain multiple-access (FDMA) are applied to the uplink, ensuring that the peak-to-average power ratio (PAPR) of the transmit power amplifiers is low. Such an uplink scenario is shown in FIG. 1 as described in more detail below. However, the main drawback of the SC-FDMA scheme is the presence of additional ISI, caused by multipath propagation. The more subcarriers of the available frequency band are allocated, the more ISI corrupts the received data streams. Therefore, especially wideband signals are prone to significant ISI that may dominate the overall interference.

Inter-symbol interference may be caused by non-orthogonal transmit filtering by the channel or by multipath propagation leading to an inherent non-linear frequency response of the transmission channel. In a multipath propagation environment a radiated signal may take different propagation paths, i.e. paths of different length, before arriving at a receiver antenna, where the signals may superpose or heterodyne, thus the signals do not arrive at the same time. In case the transmission channel exhibits a non-linear frequency response, a portion of the frequencies of a modulated signal is removed by the channel thus having impact on the pulse form of the received signal and causing successive symbols to blur together.

The phenomenon of inter-antenna interference is caused by using more than one antenna for transmitting on the same frequency resource, i.e. the two transmit antennas radiate at the same time using the same frequency, and thus the radiated signals interfere with each other.

Conventional techniques for interference reduction in MIMO receivers are linear filter operations, imposing low detection performance. As an example, the well-known MMSE detector multiplies a received signal vector by a fixed filter matrix, which is based on the estimated MIMO channel. Linear receiver solutions generally imply significant performance loss and therefore require high signal-to-interference-and-noise ratio conditions, abbreviated SINR, for reliable detection of the data streams. SINR can be increased by increasing the transmit signal power, which is hardly acceptable for mobile devices.

Enhanced but still low detection performance can be accomplished by stepwise interference reduction methods, i.e. the estimated interference of already detected data is subtracted from subsequently transmitted, not yet detected data. When considering IAI reduction, a famous method is the successive interference cancellation, abbreviated SIC. A similar method for ISI reduction is the application of decision feedback equalization, abbreviated DFE, which can be carried out either in time or in frequency domain.

So far, these methods can be applied either to wideband single-antenna systems, narrowband MIMO systems or wideband MIMO systems. Those equalization/detection methods are applied to the total interference and do not take the different interference characteristics into account. A two-stage approach as known from recent research separates the task into equalization and detection to mitigate ISI and IAI, respectively. The ISI equalization is carried out using a linear and fixed MMSE filter while the MIMO detection is carried out e.g. by a non-linear tree-search. Those tree-search-based approaches e.g. sphere detectors, that search for the most likely symbol within a given solution space, outperform MMSE and SIC significantly but come with increased computational complexity costs. Nevertheless, when implemented efficiently in hardware, sphere detection can be a promising detection method even for 4G systems that typically require high throughputs.

Besides specific equalization and detection processing, it is always possible to apply channel coding schemes in order to increase the robustness of the transmission. Furthermore, by means of iterative information exchange between detector and decoder, an additional significant detection gain (depending on the number of iterations) can be achieved. This so-called turbo principle is similarly used in modern decoder units, for example in low density parity check (LDPC) decoders.

Although immense research effort on efficient tree-search-based MIMO detection led to improved performance-complexity trade-off, the impact of frequency-selective channels is a problem. On the one hand, as soon as significant ISI is present in the received signal, the performance gain of two-stage approaches compared to low-complex linear detectors reduces dramatically. On the other hand, including ISI equalization in the sophisticated MIMO detection process would lead to an impractical overall complexity.

Hence, a wideband MIMO system based on single-carrier transmission schemes is required that efficiently tackles inter-symbol interference (ISI) and inter-antenna interference (IAI) thus enabling reliable symbol estimation.

BRIEF SUMMARY

In one general aspect a Multiple-Input and Multiple-Output (MIMO) receiver for mitigating or canceling interferences is provided when receiving and decoding at least two receive signals representing a block of signals, wherein the receiver may comprise: a frequency-domain equalizer comprising an adaptive filter for filtering the block of symbols thus producing a filtered block of symbols; a vector calculator for calculating a vector of weighted estimated symbols; an adder for adding the vector of weighted estimated symbols to the filtered block of symbols; a MIMO detector coupled to the output of the frequency-domain equalizer; a decoder for determining estimated symbols, said decoder being coupled to the output of the MIMO detector; and a first feedback path from the decoder to the frequency-domain equalizer for providing the covariance of the estimated received symbols to the adaptive MMSE filter and for providing the covariance and expectation value of the estimated received symbols to the vector calculator for calculating weighted estimated symbols.

In an additional aspect the adaptive filter can be an adaptive minimum mean squared error filter. The receiver may further comprise a second feedback path for providing likelihood values of transmit bits from the decoder to the detector. Furthermore the receiver may comprise a cyclic prefix remover for removing a cyclic prefix prepended to a received signal. In another general aspect the receiver may be comprised in a base station of a cellular communication system.

In still another general aspect, a corresponding method for a MIMO receiver to mitigate or cancel interferences, i.e. ISI and IAI, comprises adapting an adaptive filter based on the covariance of estimated received symbols provided by a first feedback path from a decoder and calculating a vector of weighted estimated symbols based on the estimated symbols and the covariance of the estimated symbols by a vector calculator, wherein the estimated symbols and the covariance thereof are provided by a first feedback path from a decoder, and calculating a vector of weighted estimated symbols based on the estimated symbols and the covariance thereof. The block of symbols then is filtered by the adaptive filter thus producing a filtered block of symbols and the vector of weighted estimated symbols is added to the filtered block of symbols thus producing a block of equalized symbols. Then symbols are detected based on the block of equalized symbols by a detector, and likelihood values of transmit bits are determined by a decoder that is coupled to the detector.

The method may further comprise the step of providing the likelihood values as produced by the decoder to the detector via a second feedback path. In still another aspect the expectation values of estimated symbols and the covariance thereof can be determined by a soft modulator comprised in the first feedback path. Furthermore, the method may comprise the step of removing a cyclic prefix from the block of symbols.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings, wherein the figures show.

DETAILED DESCRIPTION

Figure 1:
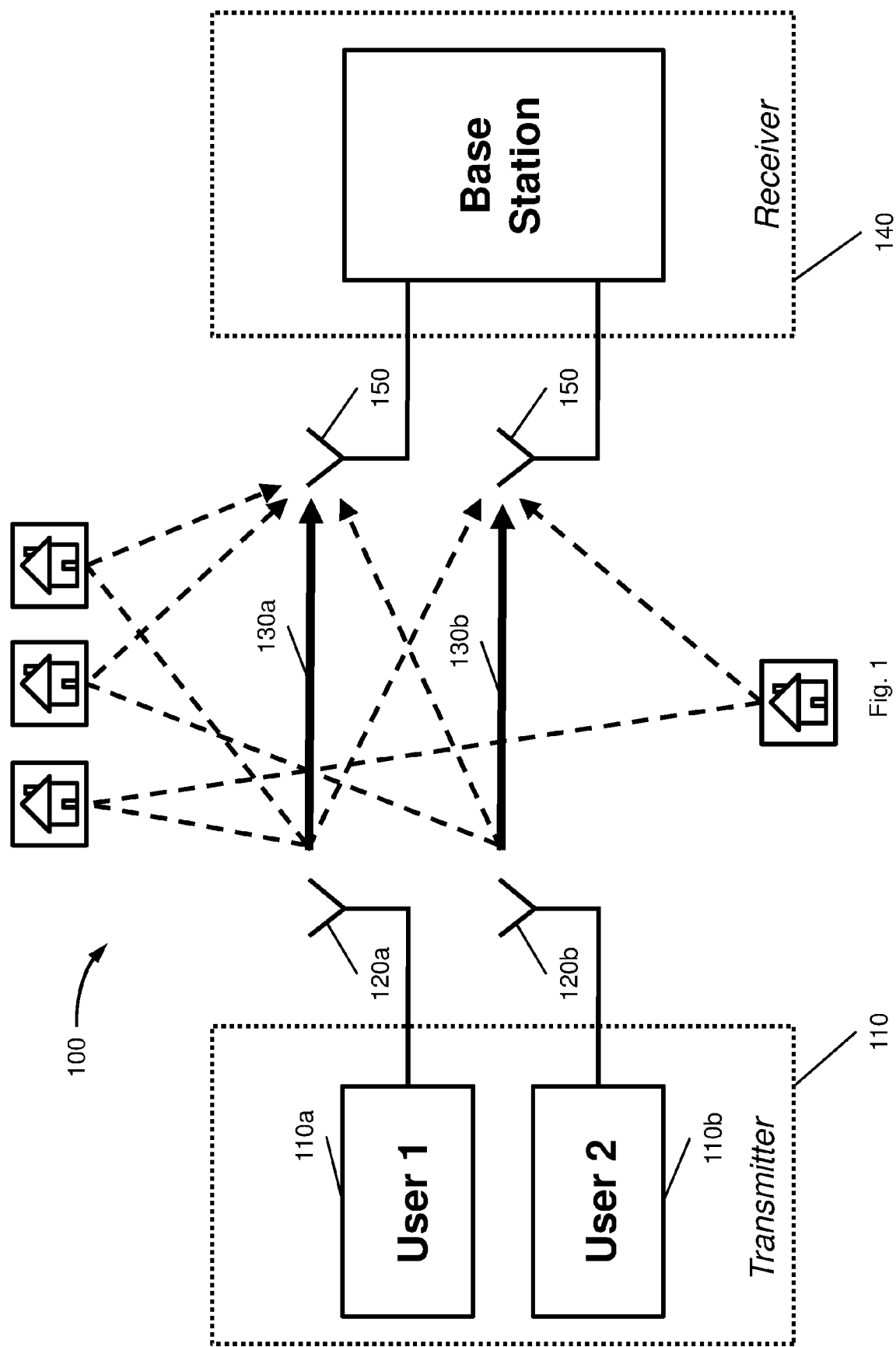
FIG. 1 illustrates signal propagation in a MIMO system.

FIG. 1 depicts a wireless Multiple-Input and Multiple-Output (MIMO) communications system 100. System 100 comprises at least one transmitter 110 comprising at least two antennas 120a, 120b that radiate signals 130a and 130b to a receiver 140.

Transmitter 110 comprises a plurality of at least two transmit antennas 120a, 120b for transmitting signals at the same time and on the same frequency, i.e. using the same radio resource. In one embodiment the transmitter may comprise at least two separate devices 110a and 110b each comprising a transmit antenna, wherein the devices may transmit using the same radio resource. Devices 110a and 110b, respectively may be operated by separate users. In an alternative embodiment transmitter 110 may be implemented by one physical device comprising at least two transmit antennas, wherein said device may be operated by one user.

A plurality of transmitters 110 may be dispersed throughout the system 100, and each transmitter may be either stationary or mobile. A transmitter may be formed by so-called User Equipment, abbreviated UE, which may also be referred to by those skilled in the art as a mobile station or a subscriber station, a mobile unit, a subscriber unit, a remote or wireless or mobile station or terminal. In particular a transmitter 110 may be formed by one or a plurality of cellular phones or personal digital assistants (PDAs) or any kind of computer.

Transmitter 110 may use any arbitrary kind of source encoding to remove any redundancies from the information to be transmitted. Furthermore, transmitter 110 uses channel encoding, i.e. an encoding allowing forward error detection and correction for mitigating transmission errors. Furthermore each transmission may comprise a preamble of known symbols, also known as pilot symbols that enable a receiver to estimate channel properties. Also a cyclic prefix can be prepended to every symbol or burst transmission, i.e. to every block of symbols.

Upon transmission, each of the antennas 120a, 120b radiates a transmit signal 130a, 130b, dedicated for reception by receiver 140. As illustrated in FIG. 1 the transmission link may include uplink (UL) transmissions from transmitter 110 formed by a UE to a receiver implemented by a base station. Though FIG. 1 illustrates an uplink transmission, the invention shall not be limited in this regard, i.e. downlink transmissions from a base station acting as a transmitter to a UE acting as a receiver shall be comprised. Note that a base station in this context for example may also be called eNodeB (eNB) or nodeB or access point.

Receiver 140 comprises at least two receive antennas 150 for receiving signals radiated by transmitter 110. As described in more detail below said transmitter 110 is capable of receiving and processing, i.e. decoding, the received signals. As illustrated receiver 140 in one embodiment can be a base station, wherein it is assumed that said base station can be communicatively coupled to a communication network.

The radiated signals will propagate using multiple paths, i.e. a radiated signal will be reflected by various obstacles as illustrated by the dashed lines and may travel, if possible, to a receiving antenna along a line of sight, i.e. without being reflected by any obstacle and as illustrated by continuous lines. The signals of the at least two transmit antennas superpose, i.e. add up, at each receive antenna of receiver 140. Consequently each receive signal is a superposition of the radiated signals, wherein each signal has propagated along the different paths having different characteristics thus arriving at different times and with different signal distortions. As a consequence for single-carrier systems with a bandwidth larger than the coherence bandwidth of the channel, above described multipath propagation causes significant transmit symbol correlation in time, which is also known as inter-symbol interference, abbreviated ISI. Furthermore, due to the MIMO transmission, all symbols radiated via different transmit antennas superpose at the receive antennas, thus leading to symbol correlation in space, also known as inter-antenna interference, abbreviated IAI.

The described time-dispersive MIMO transmission of a transmitter comprising a number of T transmit antennas, each transmit antenna radiating a number of M symbols in one sequence, and wherein the receiver comprises a number of R receive antennas can be mathematically described as $$y = H'x + n \quad (1)$$

wherein y describes a complex-valued vector of length RM of stacked receive symbols, i.e. a block of symbols comprising a number of RM symbols, x denotes a complex-valued vector of size TM containing the stacked transmit symbols, and n is a noise vector of length RM with i.i.d., i.e. identically and independently distributed, complex-valued white Gaussian noise components with zero-mean and variance $\sigma_N^2$. The complex matrix H' is of size RM×TM and represents the block channel matrix where each sub-channel matrix $H'_{rt}$ represents the considered time-dispersive channel between a transmit antenna indexed t and receive antenna indexed by r, which is modeled as an finite impulse response (FIR) filter.

Since the receiver strives to output a reliable estimate $\hat{x}$ of the transmit vector, it equalizes the received symbol vector y to remove interferences, wherein the receiver processes blocks of M symbols received by R antennas. Said block of received symbols may comprise all symbols of a codeword so thus enabling the decoder to decode codeword.

A straight-forward linear equalization approach would be the application of a TM×RM zero-forcing filter (ZF) matrix $G = H'^H(H'H'^H)^{-1}$, by means of $$\hat{x} = Gy \quad (2)$$

wherein y is a vector or block of received symbols and $\hat{x}$ is the estimated vector or block of symbols. The operator $(\bullet)^H$ denotes the hermitian of a matrix. To reduce computational complexity of the inversion as well as of multiplication, the equalization is carried out in the frequency-domain, benefitting from the cyclic prefix (CP) that is usually part of those transmission schemes. Since the cyclic prefix decouples the blocks transmitted on one carrier in time and provides for a circular convolution of the transmit signal with the channel/carrier, so the carriers are de-coupled in frequency, the frequency-domain equalization (FDE) can now operate on M channel matrices of size R×T instead of one big RM×TM channel matrix in the time-domain, which would require more complex processing.

In contrast to conventional filters that typically mitigate ISI and IAI using the same steps, the current invention separates the steps for cancelling ISI and IAI. As a consequence of separating the steps to cancel ISI and IAI, two different equalization methods of different performance and complexity can be applied, wherein the respective equalization method is adapted to the interference characteristic. Note that equalization of antenna interference may also be termed as MIMO detection in order to emphasize that a respective functional block outputs estimates $\hat{x}$ of transmit symbols and to distinguish between ISI and IAI equalization.

Figure 2:
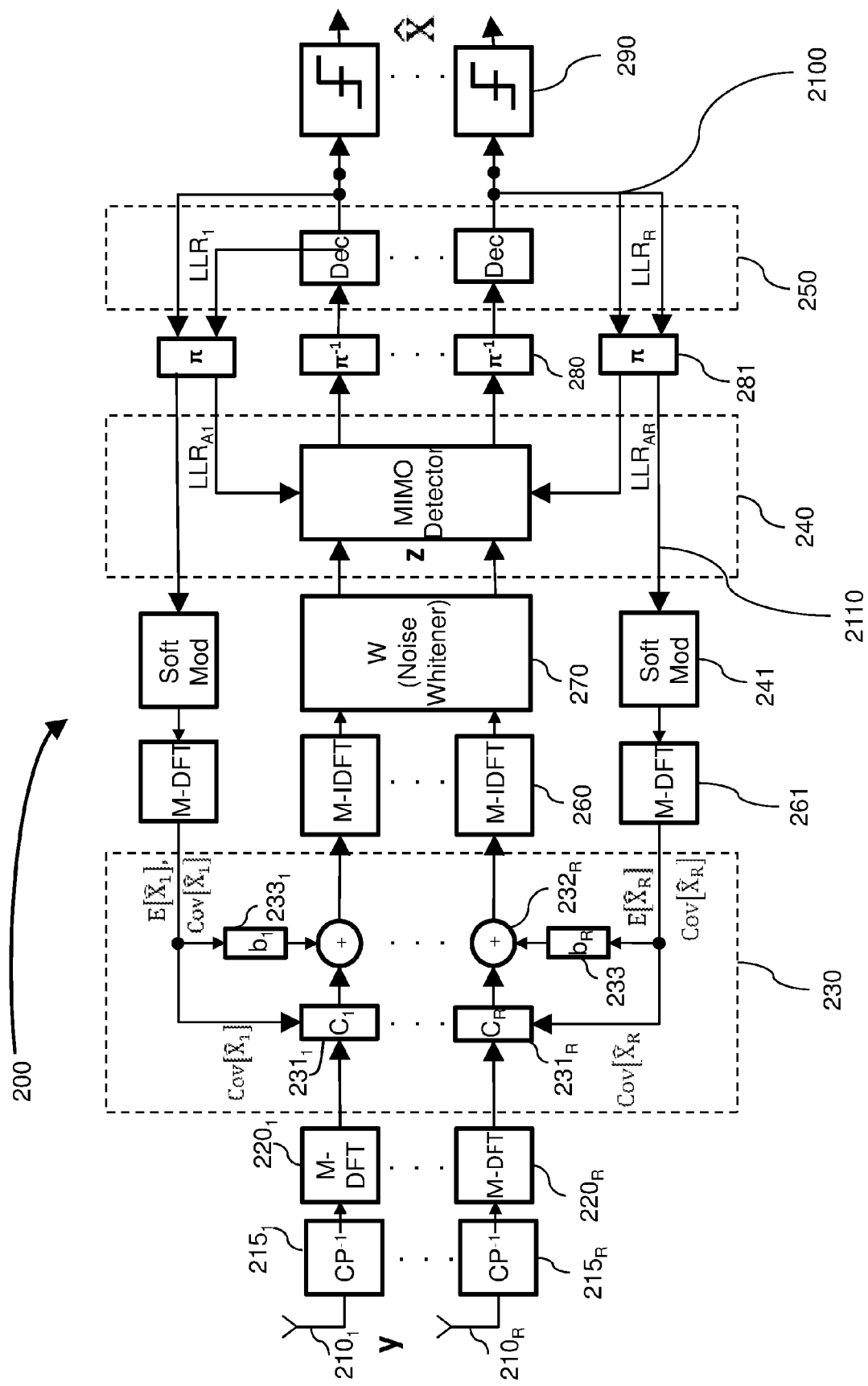
FIG. 2 illustrates a structure of a MIMO receiver.

FIG. 2 depicts a MIMO receiver 200 comprising functional blocks for equalizing a received signal, detecting symbols and decoding codewords of symbols, wherein the receiver comprises a plurality of at least two receive antennas $210_1$-$210_R$. Note that the described invention shall not be limited by the number of receive antennas, i.e. receiver may comprise more than 2 receive antennas 210 and a corresponding plurality of parallel processing branches.

Furthermore note that the depicted receiver and the functional blocks illustrate the function and operation of the receiver only, wherein the functionality actually may be implemented by software executed on any suitable digital signal processor. In other words, the depicted processing blocks serve to illustrate the processing of received signal y wherein the processing is implemented by software running on one or a plurality of general purpose processors or application specific integrated circuits.

However, note that the functions as illustrated by the functional blocks in the drawings may be implemented in software only arranged in one or a plurality of software modules. The corresponding executable code may be executed by an arbitrary plurality of hardware devices or in one arbitrary digital signal processor.

Each of the antennas $210_1 \ldots 210_R$ receives a signal vector $y_r$ representing a block of symbols, which is transformed to the frequency-domain by a M-point discrete Fourier transformation, abbreviated M-DFT, in blocks $220_1 \ldots 220_R$ after removal of the cyclic prefix in a cyclic prefix remover $215_1$-$215_R$. Note that the received signals optionally may be amplified by a low-noise amplifier, not shown in the drawing, or may be processed by other processing blocks, for example an analog-to-digital converter, before being processed as described here. However, these processing steps are well-known to a person skilled in the art, thus their in-depth description is omitted here.

It is assumed that the total channel matrix H' is known at the receiver. Due to the cyclic prefix, each sub-channel matrix in the frequency domain corresponding to a pair of the t-th transmit antenna and the r-th receive antenna is a M×M diagonal matrix $$H_{rt} = F_M H'_{rt} F_M^H. \quad (3)$$

the M-point discrete Fourier transformation (DFT) is represented by a DFT matrix $F_M$, wherein the inverse matrix is $F_M^H$ due to the unitary property.

Note that the described embodiment describes a single-carrier scenario only. However, the invention shall not be limited in this regard, since the described single-carrier system can be extended to a system comprising a plurality of subcarriers, i.e. a single-carrier frequency divisional multiple access system (SC-FDMA), wherein a subset of M<N subcarriers may be associated with one user. In such a SC-FDMA system, a N-point DFT would replace the above mentioned M-point DFT. The M subcarriers associated to one user would then be selected out of N subcarriers for further processing, i.e. so-called subcarrier demapping is performed. The processing steps as described in the following then are performed for the M subcarriers.

After conversion to the frequency domain, the frequency-domain converted signals are passed to equalizer 230 that operates in the frequency domain and that receives a feedback signal from decoder 250 as described in more detail below.

The frequency-domain equalizer 230 comprises an adaptive minimum mean squared error filter C, abbreviated MMSE-filter 231, which can be written as $C=[C_1, \ldots, C_R]^T \in \mathbb{C}^{RM \times RM}$. The MMSE-filter 231 receives a feedback signal, in particular the covariance of the estimated r-th received symbol from decoder 250 as described in more detail below. Note that equation 4 takes the covariance of the estimated symbols into account. As a consequence, when updated values of covariance are provided in subsequent iterations, filter matrix C is updated based on the provided updated covariance values. Hence, MMSE filter 231 is an adaptive filter.

The adaptive MMSE-filter matrix C is given by $$C = \tilde{H} Cov[\hat{X}] H^H (H Cov[\hat{X}] H^H + \sigma_N^2 I_{RM})^{-1} \quad (4)$$

where matrix $\tilde{H}$ is the ISI-free target channel matrix in the frequency-domain. Hereby, the target sub-channel $\tilde{H}'_{rt} = \text{diag}(H'_{rt})$ in time-domain is a diagonal matrix that takes only the first channel coefficient into account. The covariance of the frequency-domain estimates is given by $[\hat{X}] = F_{TM} Cov[\hat{X}] F_{TM}^H$. Note that $F_{TM}$ is the short form for the Kronecker product $F_{TM} = I_T \otimes F_M$. Both soft-inputs $E[\hat{X}]$ and $Cov[\hat{X}]$ can be provided by a first feedback loop 2110 from decoder 250 to equalizer 230, whereas $Cov[\hat{X}]$ is used to adapt C and is representing the reliability of the estimates $\hat{X}$. In one embodiment—not shown in the figures—both soft-inputs, i.e. covariance $Cov[\hat{X}]$ and expectation $E[\hat{X}]$ can be determined by decoder 250 and can be fed back to equalizer 230 via first feedback path 2110. In an alternative embodiment as illustrated in FIG. 2, the decoder may determine likelihood values, i.e. logarithmic likelihood values LLR, of transmit bits, the LLR values are coupled to first and second feedback paths 2110 and 2100 that may comprise functional blocks for determining the covariance $Cov[\hat{X}]$ and expectation $E[\hat{X}]$ based on the LLR values as provided by decoder 250 and as described further below.

In addition to the MMSE-filter 231, the equalizer 230 furthermore comprises a vector calculator $233_l$-$233_R$ for calculating vector B, i.e. an ISI feedback signal B, based on the expectation $E[\hat{X}]$ and on the covariance $Cov[\hat{X}]$ (expressed by the MMSE filter matrix C) according to equation (5):

The ISI feedback signal vector B is given by $$B = (\tilde{H} - CH) \underbrace{F_{TM} E[\hat{X}]}_{E[\tilde{x}]} \quad (5)$$

Note again that $F_{TM}$ is the short form for the Kronecker product $F_{TM} = I_T \mathbb{C} F_M$ and that $E[\tilde{X}] = F_{TM} E[\hat{X}]$ expresses the mean, i.e. the expectation value, of the estimated transmit symbols in the frequency-domain. This is reasonable since the equalizer operates in the frequency-domain.

As can be seen from above equation (5), vector B is the expectation value $E[\hat{X}]$ weighted by the covariance as provided by decoder 250 via first feedback path 2110. Accordingly, when the covariance is initially high ($Cov[\hat{X}] \approx I$), the values of vector B are very small, and when the covariance decreases, the values of vector B increase. The calculated ISI feedback vector signal $B = [b_1, \ldots, b_R]^T \in \mathbb{C}^{RM \times 1}$ is calculated in each loop-iteration and is added to the output signal of MMSE filter 231 by adder $232_l \ldots 232_R$, wherein the values for the estimated symbols are set to zero in the initial iteration.

The equations for vector B and matrix C can be derived by using the MMSE criterion wherein the cost function is modified to ensure that the IAI remains in the "optimally" equalized signal.

Note that the loop of functional blocks comprising equalizer 230, detector 240, decoder 250 including the feedback path from decoder 250 to equalizer 230 including the intermediate functional blocks operates on blocks of symbols, i.e. the loop processes the signals received by the at least two antennas blockwise, wherein the signals represent a block of symbols that at least comprises symbols of one codeword, thus enabling the decoder to evaluate codewords and to provide estimates of received symbols. The blocks of symbols are processed in a plurality of iterations, i.e. in at least one initial iteration and one subsequent iteration. Before a block of symbols is provided to the loop, i.e. provided to equalizer 230, variables such as likelihood values or estimates of previously processed symbols or any derived values are reset to an initial configuration. In other words the processing of each block of symbols is independent from the processing of any previously processed block of symbols.

In the initial iteration, the MMSE-filter 231 does not receive any input from decoder 250. Equalizer 230 receives a feedback signal when the first iteration of processing a received signal, the processing of received symbols, has been completed, in particular when the symbols to decode have passed decoder 250. In other words, in the initial iteration of the loop, there is no information available on the estimates. So in the initial iteration, the covariance $Cov[\hat{X}]$ is set to identity and the mean $E[\hat{X}]$ is set to zero, thus the feedback signal does not have any impact on MMSE-filter 231 in the first, i.e. the initial iteration of processing a block of symbols. Hence, in the initial iteration of processing a received block of symbols, the equalizer acts as a conventional MMSE-filter, apart from the fact that the inter-symbol interference-free channel matrix $\tilde{H}$ is still considered.

The signals as output by equalizer 230 are transformed into time domain by applying an M-point inverse Fourier transformation in block 260. Since the previous filtering also correlates to the noise samples, i.e. the noise gets colored by the filtering, the output of equalizer 230 passes a conventional whitening filter W 270 thus producing a signal as $$z = W(F_{RM}^H [CY + B]). \quad (6)$$

Said signal z is passed to MIMO detector 240, i.e. MIMO detector operates on input vectors $z_m$ of length R and channel matrices $W_m H'_m$ of size R×T.

Note that MIMO detector 240 can be implemented by any conventional MIMO detector capable of processing a-priori information, e.g. one single-in single-out (SISO) sphere detector per time slot/symbol. Note that a SISO sphere detector is capable to process signals received by a plurality of antennas. In contrast to equalizer 230, detector 240 may take log-likelihood-ratio (LLR) values of bits as soft input via a second feedback path from decoder 250. The output of a sphere detector is TK likelihood values, i.e. LLR values, that correspond to one estimated symbol vector $\hat{X}_m$ and wherein K is the number of bits per symbol. For example, if a 64-QAM modulation is used, then K=6 bit are required for indexing the $2^6 = 64$ constellation points of the 64-QAM modulation.

Thus, when considering a 4×4 MIMO system, i.e. considering a transmitter comprising 4 transmit antennas, with 64-QAM symbols, detector 240 would output 4·6=24 LLR values at once, i.e. one LLR value for each bit of each symbol radiated by one transmit antenna.

In one optional embodiment, the likelihood values, i.e. the bits of the likelihood values, as output by MIMO detector 240 can be forwarded to a de-interleaver 280 that reverses a corresponding interleaving performed at the transmitter side.

The de-interleaved likelihood values then are forwarded to decoder 250, which channel-decodes the likelihood values. Decoder 250 buffers the bits of the likelihood values, i.e. the LLR values, until a complete codeword has been detected. The de-interleaved codeword is then processed by a decoder block, e.g. a so-called low-density parity check LDPC decoder. Note that any arbitrary channel encoding and a corresponding decoder can be used for detecting and correcting erroneous bits. Since the decoder is capable to detect and correct erroneous bits, it outputs an improved estimate of the bits, i.e. the log likelihood ratio (LLR) values as output by the detector exhibit a higher reliability.

In this way the processing chain comprising frequency-domain equalizer 230, MIMO detector 240 and decoder 250 as well as the intermediate blocks of the M-point DFT 260, noise whitener 270 and optional interleaver 280 form a forward path for processing a received block of symbols Y.

If no further iterative processing of the received signal is to be performed, decoder 250 forwards the likelihood values to hard decision block 290, which outputs estimates $\hat{X}$ of the transmit symbols.

If further iterative processing of the received signal shall be performed in order to increase the reliability of the estimates $\hat{X}$, the likelihood values LLR as output by decoder 250 optionally can be provided to detector 240 as additional soft-information via second feedback path 2100, wherein these LLR values are interleaved by an interleaver 281, if the received symbols represent interleaved bits, i.e. if the transmitter applies a corresponding interleaving to the transmit bits.

As mentioned above and as depicted in FIG. 2 the LLR values of the transmit bits can be provided to first feedback path 2110, wherein first feedback path 2110 is adapted for determining covariance Cov[$\hat{X}$] and expectation E[$\hat{X}$] based on the provided LLR values and for providing said values to equalizer 230. In one embodiment first feedback path 2110 may comprise above mentioned interleaver 281. Furthermore feedback path 2110 may comprise a soft-modulator 241 for determining covariance Cov[$\hat{X}$] and expectation E[$\hat{X}$] based on the LLR values of the transmit bits, and a M-point discrete Fourier transformation 261 for transforming these values to the frequency domain before passing these values to frequency domain equalizer 230.

In a subsequent iteration following the initial processing iteration, the frequency-domain equalizer 230 and detector 240 take the additional information as provided by the feedback paths 2100 and 2110 into account.

Accordingly, in the subsequent iteration frequency-domain equalizer 230 adapts filter C 231 based on the covariance of the estimated transmit signal vector as obtained in the previous or initial iteration, filters a previously buffered version of the symbols as received in the initial iteration using the adapted filter C, confer reference numeral 231, and then forwards the filtered block of symbols to adder 232. Note that the covariance represents the reliability of the estimate.

Vector B is determined based on the provided expectation value E[$\hat{X}$] and the provided covariance thereof Cov[$\hat{X}$] in vector calculator $233_1$-$233_R$, wherein vector B reflects the provided expectation value but weighted by the covariance as described above in equation (5). Adder 232 then adds vector B to the output of the adaptive MMSE filter 231 thus further removing parts of the residual intersymbol interference from the filtered symbol as output by filter C 231. In this way equalizer 230 outputs a block of equalized symbols.

Note that in any subsequent iteration, i.e. each iteration except the initial, the first feedback path from decoder 250 to equalizer 230 provides a non-zero value of E[$\hat{X}$] and a non-zero covariance matrix. Adaptive filter C, i.e. adaptive MMSE filter $231_1$ . . . $231_R$, adapts its filter matrix as described above with reference to equation (4) and vector B is determined as described above with reference to equation (5). Since in early iterations the covariance is high, the adaptive MMSE filter 231 to a large extent passes the originally received block of symbols, which is provided to the adaptive filter in each iteration and the values of the weighted expectation E[$\hat{X}$] are small compared to subsequent iterations. However, since the value of the covariance decreases in subsequent iterations, adaptive filter 231 more and more blocks out the block of originally received symbols as provided to filter 231 due to the adaption to the provided covariance while at the same time the signal portion of the weighted expectation value increases during the iterations. In this way parallel ISI cancellation is performed in the frequency domain.

Note that frequency-domain equalizer 230 does not take soft-bits, i.e. probability values, as input, but requires soft symbols in the frequency domain. As shown in "Minimum mean squared error equalization using a priori information" by M. Tuechler et al, published in IEEE Transactions on Signal Processing, Vol. 50, 2002, the LLR values of L individual bits can be converted to a mean E[$\hat{X}_{tm}$] and a variance Var[$\hat{X}_{tm}$] value of a corresponding symbol estimate. As a consequence the feedback path from decoder 250 to frequency-domain equalizer 230 performs such soft-value conversion and subsequently transforms the soft-bits to soft-symbols in the frequency domain. The provided soft-symbols in the frequency domain serve to re-compute adaptive filter C and to calculate vector B.

In this way frequency-domain equalizer 231 does not only use channel-state information but also uses a-priori information on the probably transmitted symbols $\hat{X}$ in order to provide an enhanced, i.e. a more reliable, output z to detector 240.

Similar as described above for the initial iteration, frequency-domain equalizer 230 in the subsequent iteration outputs the revised signals to an M-point IDFT 260 and a noise whitener 270 that in turn provide the revised signals to MIMO detector 240. In the subsequent iteration MIMO detector does not only take the additional a-priori information from decoder 250 to improve inter-antenna reduction, but operates on a revised input signal z as provided by frequency-domain equalizer 230, i.e. in the subsequent iteration of the processing signal z exhibits less inter-symbol interference than in the initial iteration. As a consequence detector 240 will output a more reliable LLR value to decoder 250.

Likewise MIMO detector 240 itself uses a-priori information as provided by decoder 250 via the second feedback path in the subsequent iteration to rather perform maximum a-posteriori probability (MAP) detection instead of maximum likelihood (ML) detection.

The MIMO detector 240 may approximate the optimal detection in order to reduce computational complexity, e.g. in order to reduce the complexity of the so-called maxLog-MAP detection. Taking the a-priori information into account the metric calculation, which is the fundamental operation within the SISO sphere detection, is given by $$\lambda_0 = \|z - WH'\hat{x}(c)\|^2 - \frac{\sigma_N^2}{2}\sum_{t=0}^{T}\sum_{l=1}^{L} c_{tl} LLR(c_{tl}), \quad (7)$$

wherein $c_{tl}$ denotes the l-th bit of the transmit symbol $x_t$ and likelihood value, i.e. $LLR(c_{tl})$, is the corresponding a-priori information, as known from "Towards Complexity-Reduced Soft-Input Soft-Output Sphere detection", bei T. Seifert et al in the "'$9^{th}$ International ITG Conference on Systems, Communications and Coding, 2013". As described in this publication, the decoder LLR output can be directly processed by the MIMO detector 240.

The output of decoder 250 in the subsequent iteration can be provided to hard decision block 290 or, alternatively, another subsequent iteration of the processing as described above can be performed to further mitigate inter-symbol interference and inter-antenna interference. In this way, i.e. by using the two feedback loops 2100 and 2110 the inter-symbol interference and the inter-antenna interference can be mitigated stepwise by iterations. As a result a significant communications performance gain can be expected in the order of more than 10 dB, wherein the additional gain decreases from iteration to iteration thus approaching a saturation performance.

So in contrast to conventional iterative approaches of MIMO receivers that either focus exclusively on detection-decoding iterations or exclusively on turbo equalization, the disclosed receiver comprises a first feedback path 2110 from the decoder to the frequency-domain equalizer and a second feedback path 2100 from the decoder to the detector. In this way the detector operates not only on one additional input, but on two improved input values in any subsequent iteration i.e. except in the initial iteration, since the reliability of both the input value z and the additional a-priori information fed back to the decoder improve in every iteration.

What is claimed is:

1. A multiple-input multiple-output (MIMO) receiver for receiving and decoding at least two receive signals representing a block of symbols comprising:
    a frequency-domain equalizer comprising an adaptive filter configured to filter the block of symbols to produce a filtered block of symbols, a vector calculator configured to calculate a vector of weighted estimated symbols, and an adder configured to add the vector of weighted estimated symbols to the filtered block of symbols;
    a MIMO detector coupled to an output of the frequency-domain equalizer for outputting log likelihood values;
    a decoder for channel-decoding the log likelihood values to thus produce improved estimates of the log likelihood values, the decoder being coupled to an output of the MIMO detector; and
    a first feedback path from the decoder to the frequency-domain equalizer configured to provide a covariance of the improved estimates of the log likelihood values to the adaptive filter and configured to provide the covariance and expected values of the improved estimates of the log likelihood values to the vector calculator for calculating the vector of weighted estimated symbols; and
    a second feedback path configured to provide the improved estimates of the log likelihood values from the decoder to the MIMO detector.

2. The MIMO receiver of claim 1, wherein the first feedback path is configured to determine expected values of estimated symbols and the covariance thereof based on the improved estimates of the log likelihood values.

3. The MIMO receiver of claim 2, wherein the first feedback path comprises a soft-modulator configured to determine expected values of estimated symbols based on the the improved estimates of the log likelihood values and configured to determine the covariance thereof.

4. The MIMO receiver of claim 2, wherein the first feedback path is configured to transform the expected values of estimated symbols into the frequency domain.

5. The MIMO receiver of claim 1, further comprising a cyclic prefix remover.

6. The MIMO receiver of claim 1, wherein the adaptive filter comprised in the frequency-domain equalizer is an adaptive minimum mean squared error filter.

7. The MIMO receiver of claim 1, wherein the MIMO receiver is comprised in a base station of a cellular communication system.

8. A method for receiving and decoding at least two received signals representing a block of symbols in a multiple-input multiple-output receiver (MIMO) comprising:
    adapting an adaptive filter based on a covariance of estimated symbols provided by a first feedback path from a decoder and calculating a vector of weighted estimated symbols based on the estimated symbols and the covariance of the estimated symbols;
    filtering the block of symbols by the adaptive filter to produce a filtered block of symbols and adding the vector of weighted estimated symbols to the filtered block of symbols to produce a block of equalized symbols;
    detecting symbols by a MIMO detector based on the block of equalized symbols and outputting log likelihood values;
    channel-decoding the log likelihood values and producing improved estimates of the log likelihood values by a decoder coupled to the MIMO detector; and
    providing the improved estimates of the log likelihood values from the decoder to the MIMO detector via a second feedback path.

9. The method of claim 8, further comprising determining expected values of estimated symbols and the covariance thereof by a soft modulator comprised in the first feedback path.

10. The method of claim 8, further comprising removing a cyclic prefix from the block of symbols.

11. The method of claim 8, wherein the adaptive filter is an adaptive minimum mean squared error filter.

12. The method of claim 8, wherein the method is performed in a base station of a cellular communication system.

* * * * *